US009479449B2

(12) United States Patent
Breternitz et al.

(10) Patent No.: US 9,479,449 B2
(45) Date of Patent: Oct. 25, 2016

(54) WORKLOAD PARTITIONING AMONG HETEROGENEOUS PROCESSING NODES

(71) Applicant: Advanced Micro Devices, Inc., Sunnyvale, CA (US)

(72) Inventors: Mauricio Breternitz, Austin, TX (US); Gary Frost, Driftwood, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 500 days.

(21) Appl. No.: 13/908,887

(22) Filed: Jun. 3, 2013

(65) Prior Publication Data

US 2014/0359126 A1 Dec. 4, 2014

(51) Int. Cl.
G06F 15/16 (2006.01)
H04L 12/911 (2013.01)
G06F 9/50 (2006.01)

(52) U.S. Cl.
CPC ............ *H04L 47/70* (2013.01); *G06F 9/5044* (2013.01); *Y02B 60/142* (2013.01)

(58) Field of Classification Search
CPC .................................................... H04L 47/70
USPC ........................................................ 709/226
See application file for complete search history.

(56) References Cited

U.S. PATENT DOCUMENTS 5,325,526 A * 6/1994 Cameron et al. ............. 718/102
2006/0253855 A1* 11/2006 Grabarnik ............... G06F 9/505
                                                                    718/104
2007/0226226 A1* 9/2007 Mintz ............................ 707/10
2011/0295968 A1* 12/2011 Takaoka et al. ............. 709/213
2012/0166514 A1* 6/2012 Mathew ........................ 709/201
2012/0291040 A1  11/2012 Breternitz et al.
2012/0297163 A1  11/2012 Breternitz et al.

OTHER PUBLICATIONS

Low et al, "GraphLab: A Distributed Framework for Machine Learning in the Cloud", arXiv: 1107.0922v1 [cs.LG], Jul. 5, 2011, 14 pages.
Yigitbasi et al., "Energy Efficient Scheduling of MapReduce Workloads on Heterogeneous Clusters", Dec. 12, 2011, 6 pages, Green Computing Middleware of the $2^{nd}$ International Workshop, Lisbon, Portugal.
Rodrigues et al., "Scalable Thread Scheduling in Asymmetric Multicores for Power Efficiency", 2012, 8 pages, 2012 IEEE $24^{th}$ International Symposium on Computer Architecture and High Performance Computing.

* cited by examiner

*Primary Examiner* — Ario Etienne
*Assistant Examiner* — Sahera Halim
(74) *Attorney, Agent, or Firm* — Park, Vaughan, Fleming & Dowler LLP (57) ABSTRACT

A method of computing is performed in a first processing node of a plurality of processing nodes of multiple types with distinct processing capabilities. The method includes, in response to a command, partitioning data associated with the command among the plurality of processing nodes. The data is partitioned based at least in part on the distinct processing capabilities of the multiple types of processing nodes.

18 Claims, 7 Drawing Sheets

WORKLOAD PARTITIONING AMONG HETEROGENEOUS PROCESSING NODES

TECHNICAL FIELD

The present embodiments relate generally to distributed computing systems, and more specifically to partitioning a workload among processing nodes of different types.

BACKGROUND

A processing workload (e.g., for a cloud-based application) may be partitioned among multiple processing nodes in a distributed computing system, such that different processing nodes process different portions of the workload. Different processing nodes in the distributed computing system may have different processing capabilities.

SUMMARY

In some embodiments, a method of computing is performed in a first processing node of a plurality of processing nodes of multiple types with distinct processing capabilities. The method includes, in response to a command, partitioning data associated with the command among the plurality of processing nodes. The data is partitioned based at least in part on the distinct processing capabilities of the multiple types of processing nodes.

In some embodiments, a processing node includes one or more processors and memory storing one or more programs configured for execution by the one or more processors. The one or more programs include instructions to partition data among a plurality of processing nodes, in response to a command associated with the data. The plurality of processing nodes includes different types of processing nodes with distinct processing capabilities. The instructions to partition the data include instructions to partition the data based at least in part on the distinct processing capabilities of the multiple types of processing nodes.

In some embodiments, a non-transitory computer-readable storage medium stores one or more programs configured for execution by one or more processors. The one or more programs include instructions to partition data among a plurality of processing nodes, in response to a command associated with the data. The plurality of processing nodes includes different types of processing nodes with distinct processing capabilities. The instructions to partition the data include instructions to partition the data based at least in part on the distinct processing capabilities of the multiple types of processing nodes.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
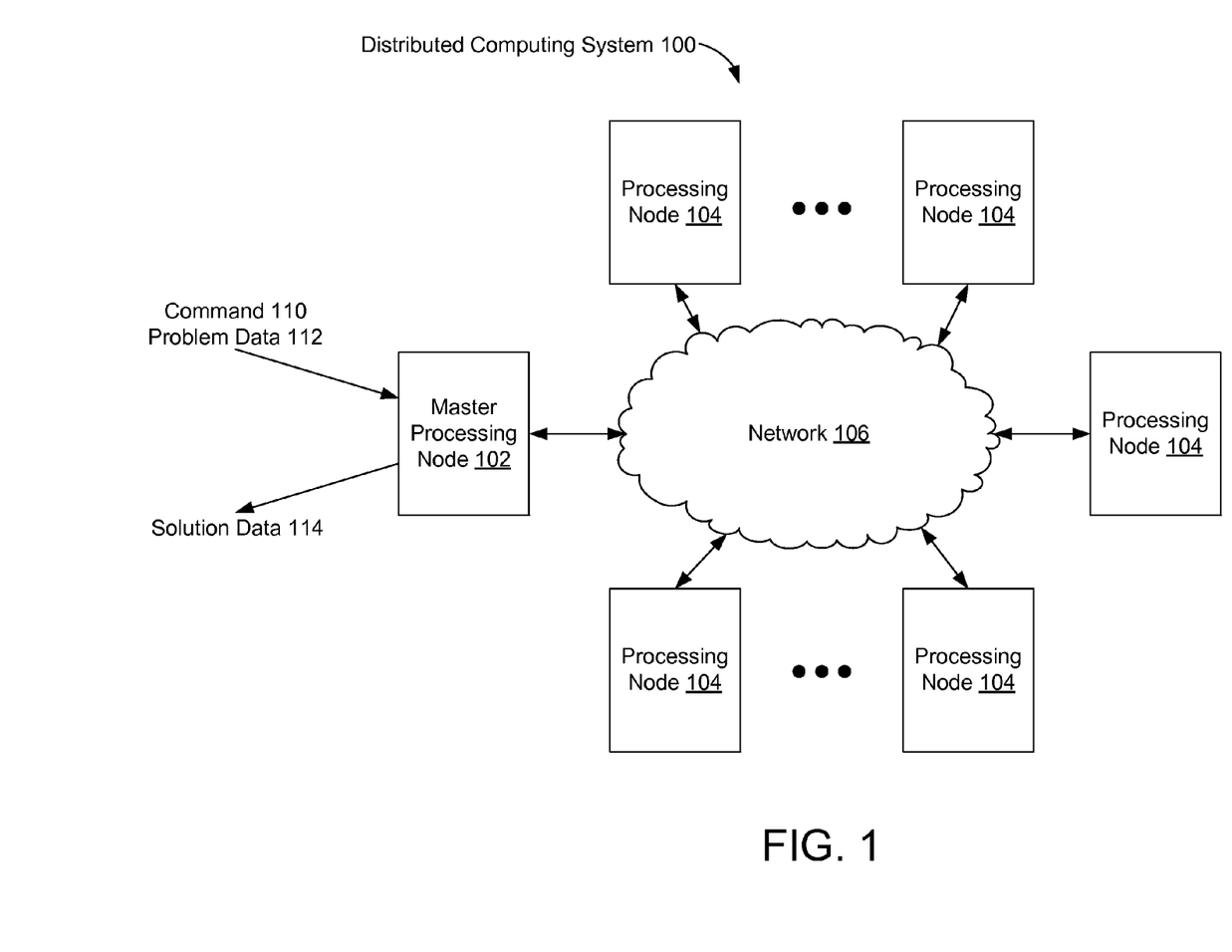
FIG. 1 is a block diagram of a distributed computing system that includes a master processing node coupled to a plurality of processing nodes through a network in accordance with some embodiments.

FIG. 1 is a block diagram of a distributed computing system 100 that includes a master processing node 102 (also referred to as a management processing node) coupled to a plurality of processing nodes 104 through a network 106 in accordance with some embodiments. The topology of the network 106, and thus the topology in which the processing nodes 104 are coupled to teach other and to the master processing node 102, may vary between different embodiments. The processing nodes 104 are heterogeneous, such that they include different types of processing nodes 104 with different processing capabilities. Different types of processing nodes 104 may include different numbers and/or types of processors (e.g., central processing units (CPUs)) and may include different numbers and/or types of processing accelerators (e.g., graphics processing units (GPUs)).

In some embodiments, the distributed computing system 100 is implemented in a data center. The master processing node 102 and/or each processing node 104 may correspond to a respective group of integrated circuits mounted on one or more printed circuit boards. For example, the master processing node 102 and processing nodes 104 are server computers (e.g., blade servers) in a data center. Alternatively, the master processing node 102 and/or each processing node 104 may correspond to a respective processor (e.g., a CPU or GPU) implemented in a distinct integrated circuit, or to a respective processor core that is part of an integrated circuit. In some such embodiments, the master processing node 102 and processing nodes 104 collectively include integrated circuits, or portions thereof, distributed among multiple computers (e.g., server computers, such as blade servers) in a data center.

The master processing node 102 may partition a workload and distribute the workload, as partitioned, among the plurality of processing nodes 104. Different processing nodes 104 thus perform different portions (i.e., different partitions) of the workload. The master processing node 102 may distribute a portion of the workload to itself, such that it also performs a portion of the workload. Alternatively, the master processing node 102 partitions the workload but does not process any portion of the workload itself.

In the example of FIG. 1, the master processing node 102 receives a command 110 and problem data 112 associated with the command 110. The master processing node 102 partitions the problem data 112 and distributes portions of the problem data 112, as partitioned, to respective processing nodes 104 for processing. The respective processing nodes 104 provide the results of processing their respective portions of the problem data 112 to the master processing node 102, which processes (e.g., combines) the results and produces solution data 114 accordingly.

In some embodiments, the distributed computing system 100 is part of a wider distributed computing system. For example, the distributed computing system 100 may be a particular level in a hierarchically arranged system. Each processing node 104 may act as a master processing node 102 for another distributed computing system 100 at a lower level in the overall system. Likewise, the master processing node 102 may act as a processing node 104 coupled to a master processing node 102 at a higher level in the overall system. In some embodiments, such a hierarchical system is used to implement a hierarchical MapReduce technique.

In partitioning the workload (e.g., the problem data 112), the master processing node 102 considers the different processing capabilities of different types of processing nodes in the distributed computer system 100. In some embodiments, the master processing node 102 partitions the workload to reduce or minimize usage of one or more resources. For example, the master processing node 102 partitions the workload in a manner that reduces or minimizes the time, energy, or cost associated with processing the workload.

Figure 2A:
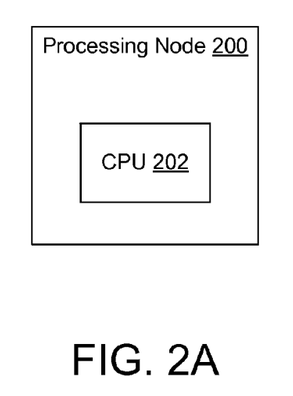
FIGS. 2A-2D are block diagrams of examples of different processing nodes in accordance with some embodiments.
Figure 2B:
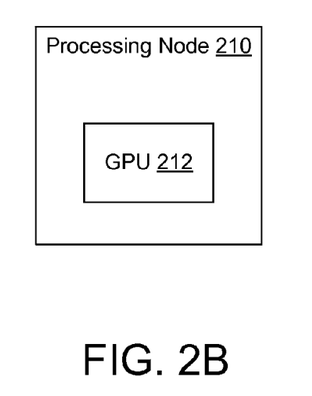
Figure 2C:
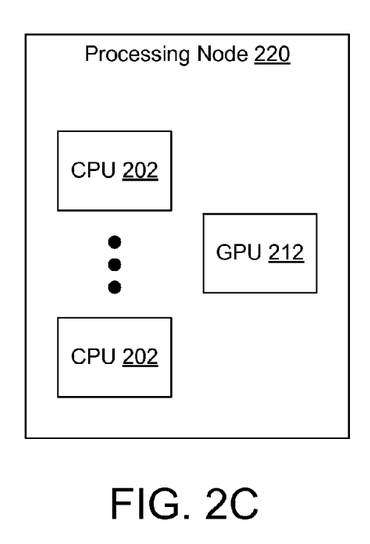
Figure 2D:
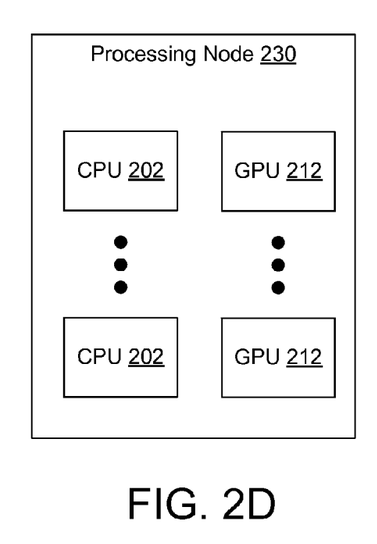

FIGS. 2A-2D are block diagrams of examples of different processing nodes 200, 210, 220, and 230, respectively, in accordance with some embodiments. Each of the processing nodes 200, 210, 220, and 230 is an example of a processing node 104 or master processing node 102 (FIG. 1). In FIG. 2A, a processing node 200 includes a single CPU (e.g., with one or more processor cores) 202. In FIG. 2B, a processing node 210 includes a single GPU 212 (e.g., with one or more GPU cores). In FIG. 2C, a processing node 220 includes two or more CPUs 202 (e.g., each with one or more processor cores) as well as a GPU 212 (e.g., with one or more GPU cores). In FIG. 2D, a processing node 230 includes two or more CPUs 202 (e.g., each with one or more processor cores) and two or more GPUs 212 (e.g., each with one or more GPU cores). Other examples are possible. For example, a processing node 104 or master processing node 102 may include one CPU 202 and two or more GPUs 212, two or more CPUs 202 but no GPU 212, or may include two or more GPUs 212 but no CPU 202. A processing node 104 or master processing node 102 may include one or more processing accelerators of a type besides a GPU 212. Furthermore, different instances of a processing node 200, 210, 220, or 230 may have different processing capabilities. For example, they may have different types of CPUs 202, GPUs 212, or other hardware.

Figure 3:
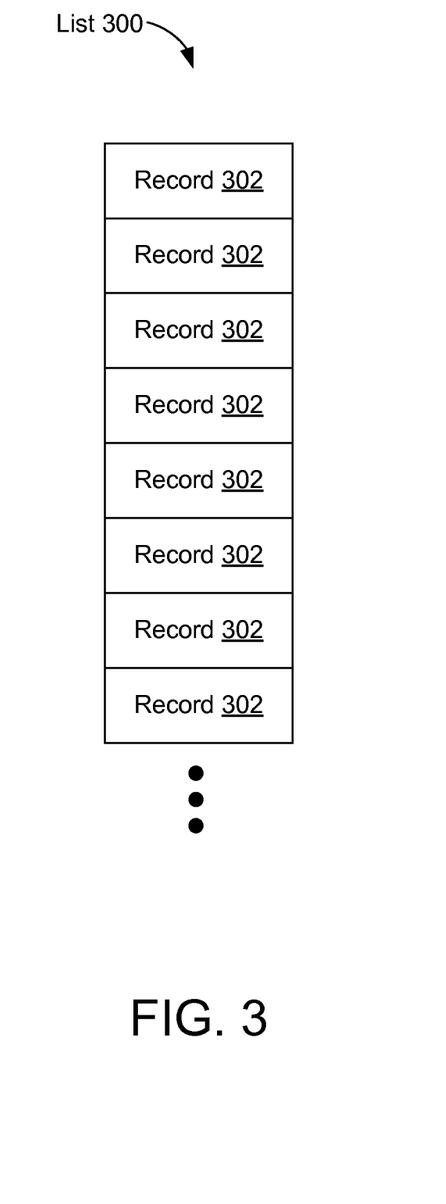
FIG. 3 shows a workload structured as a list of records in accordance with some embodiments.

Workloads (e.g., problem data 112, FIG. 1) to be partitioned by the master processing node 102 may have different data structures. In some embodiments, a workload is structured as a list 300 of records 302 to be processed, as shown in FIG. 3. The master processing node 102 assigns different records 302 (or different groups of records 302) to different processing nodes 104 (and, in some embodiments, to itself) for processing. For example, different numbers of records 302 and/or records 302 of different sizes are assigned to different types of processing nodes 104 for processing, based at least in part on the processing capabilities of the different types of processing nodes 104.

Figure 4:
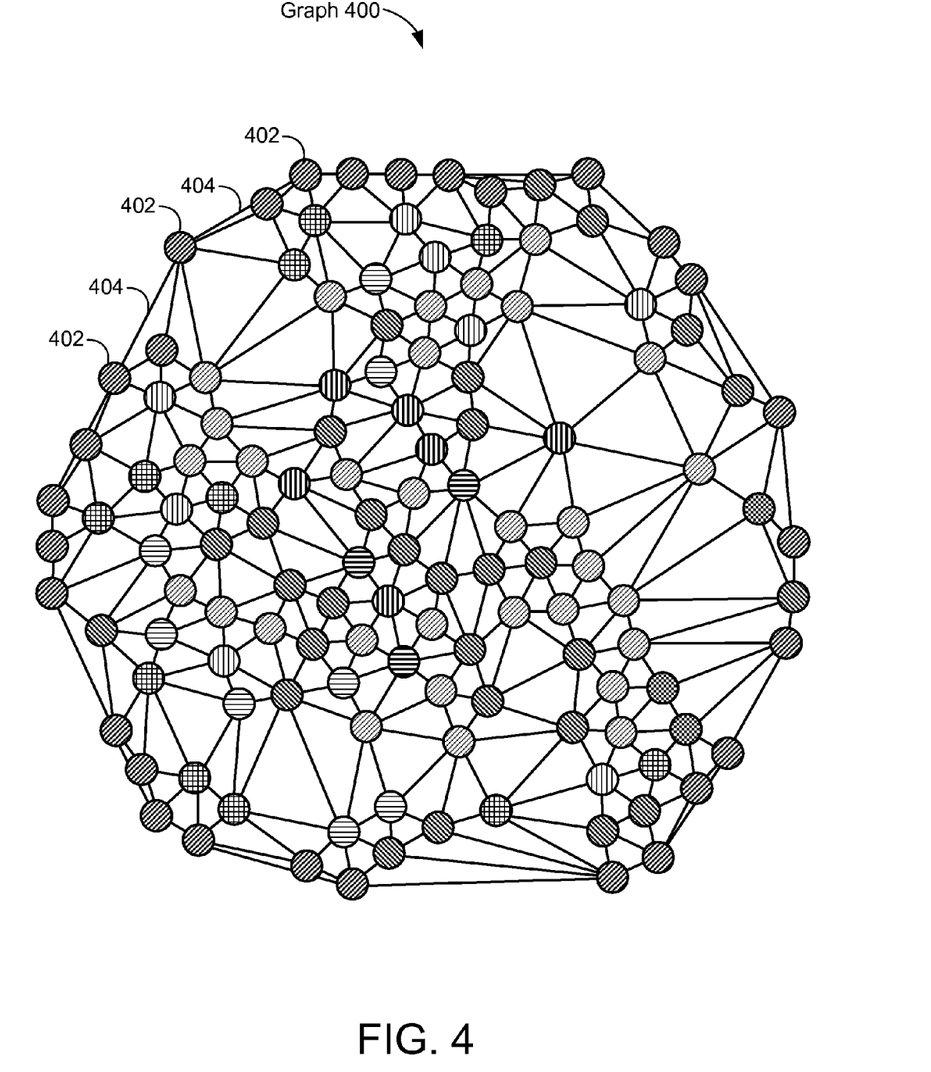
FIG. 4 shows a workload structured as a graph with vertices and edges in accordance with some embodiments.

In some embodiments, a workload is structured as a graph 400, as shown in FIG. 4. The graph 400 includes vertices 402. (The vertices 402 could also be referred to as nodes, but are referred to as vertices herein to avoid confusion with processing nodes 104). Pairs of vertices 402 are joined by edges 404. (Only a few of the vertices 402 and edges 404 are labeled in FIG. 4, for visual clarity.) Data is associated with each vertex 402 and/or edge 404. The master processing node 102 assigns different vertices 402 and/or edges 404 to different processing nodes 104 (and, in some embodiments, to itself) for processing. For example, different groups of vertices 402 (as indicated by different fill patterns in FIG. 4) are assigned to different types of processing nodes 104 for processing, based at least in part on the processing capabilities of the different types of processing nodes 104.

Figure 5A:
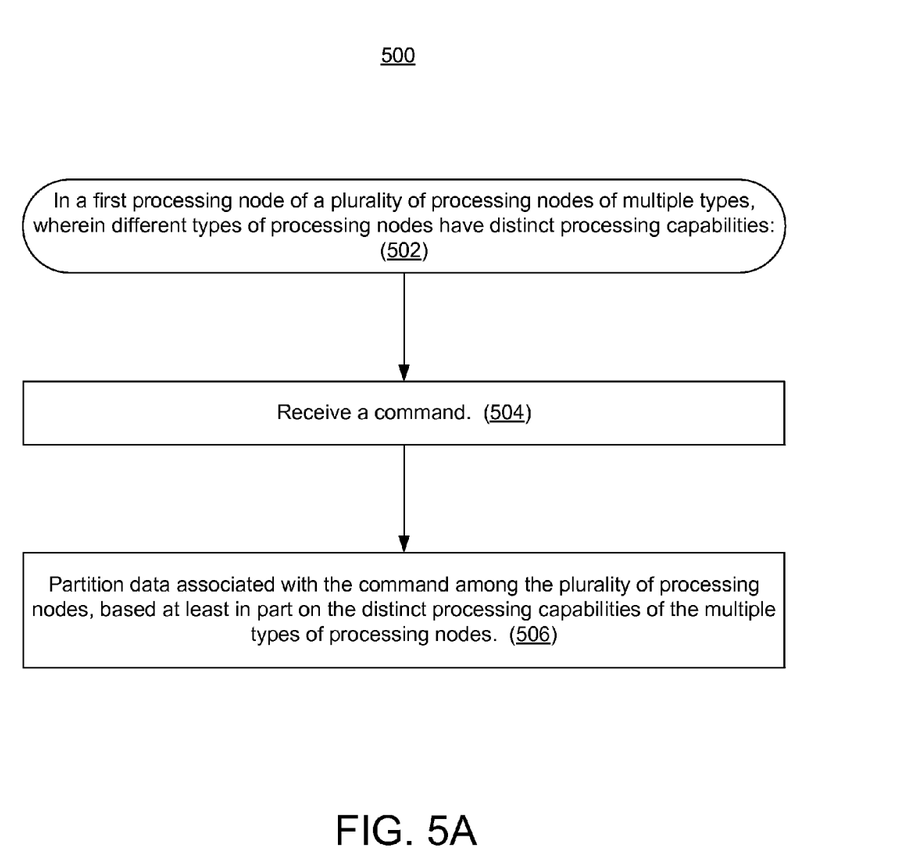
FIGS. 5A and 5B are flowcharts showing methods of partitioning data in accordance with some embodiments.

FIG. 5A is flowchart showing a method 500 of partitioning data in accordance with some embodiments. The method 500 is performed (502) in a first processing node (e.g., the master processing node 102, FIG. 1) of a plurality of processing nodes of multiple types (e.g., including the processing nodes 104, FIG. 1). Different types of the processing nodes have distinct processing capabilities (e.g., as described with regard to FIGS. 2A-2D).

In the method 500, a command (e.g., the command 110) is received (504) at the first processing node. In response, the first processing node partitions (506) data associated with the command among the plurality of processing nodes, based at least in part on the distinct processing capabilities of the multiple types of processing nodes.

Figure 5B:
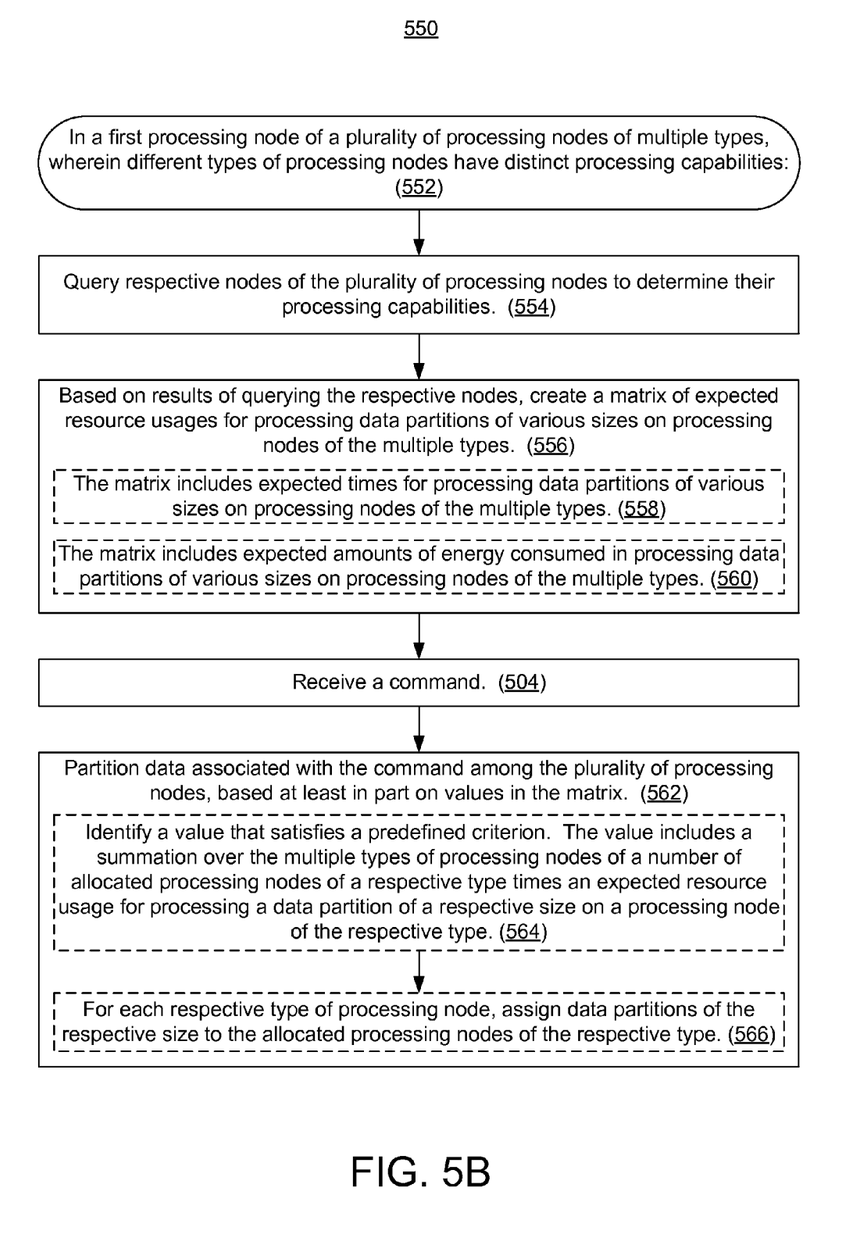

FIG. 5B is a flowchart showing a method 550 of partitioning data in accordance with some embodiments. A part of the method 550 may include the method 500 (FIG. 5A). The method 550, like the method 500, is performed (552) in a first processing node (e.g., the master processing node 102, FIG. 1) of a plurality of processing nodes of multiple types (e.g., including the processing nodes 104, FIG. 1). Different types of the processing nodes have distinct processing capabilities (e.g., as described with regard to FIGS. 2A-2D).

The first processing node (e.g., the master processing node 102, FIG. 1) queries (554) respective nodes of the plurality of processing nodes (e.g., respective processing nodes 104, FIG. 1) to determine their processing capabilities.

Based on results of querying the respective nodes, and thus based on the processing capabilities of the respective nodes, a matrix is created (556) of expected (e.g., estimated) resource usages for processing data partitions of various sizes on processing nodes of the multiple types. The matrix, Expected_resource_usage[i,S], provides amounts of expected (e.g., estimated) resource usage for processing data partitions (e.g., portions of a workload) of sizes S on processing nodes of types i, where the variable S spans the possible sizes of data partitions (with suitable granularity) and the variable i spans the types of processing nodes in the plurality of processing nodes (e.g., in the distributed computing system 100, FIG. 1). In some embodiments, the values of expected resource usage in the matrix are processing times: the matrix is a matrix Expected_time[i,S], which includes (558) expected processing times for processing data partitions of sizes S on processing nodes of types i. In some embodiments, the values of expected resource usage in the matrix are amounts of energy: the matrix is a matrix Expected_energy[i,S], which includes (560) amounts of energy expected to be consumed in processing data partitions of sizes S on processing nodes of types i. In some embodiments, the values of expected resource usage in the matrix are costs: the matrix is a matrix Expected_cost[i,S], which includes expected costs of processing data partitions of sizes S on processing nodes of types i. Other examples are possible: the matrix may store other examples of expected resource usage metrics associated with processing data partitions of sizes S on processing nodes of types i.

A command (e.g., the command 110) is received (504) at the first processing node, as described for the method 500

(FIG. 5A). Data (e.g., problem data 112) is associated with the command; this data composes a workload to be partitioned.

In response to the command, the first processing node partitions (562) the data associated with the command among the plurality of processing nodes, based at least in part on values in the matrix. Because the values in the matrix are based at least in part on the distinct processing capabilities of the multiple types of processing nodes, the data is thus partitioned based at least in part on the distinct processing capabilities of the multiple types of processing nodes. The partitioning operation 562 is thus an example of the partitioning operation 506 (FIG. 5A).

In some embodiments, partitioning (562) the data includes identifying a value of the following expression that satisfies a predefined criterion:

$$\Sigma_i N_a[i]*\text{Expected\_resource\_usage}[i, S[i]] \quad (1)$$

where $N_a[i]$ is a number of processing nodes of a given type i that are allocated to process respective data partitions and $S[i]$ is the data partition size for a given type i of processing nodes. The number $N_a[i]$ is less than or equal to a number $N[i]$ of processing nodes of a given type in a system such as the distributed computing system 100, and may be equal to zero. All, a portion, or none of the processing nodes of a given type i therefore may be allocated to process respective data partitions of a workload.

Expression (1) is evaluated with the constraint that the data partitions must sum to the total size of the data (e.g., the size of the problem data 112, FIG. 1, and thus of the workload):

$$\Sigma_i N_a[i]*S[i] = \text{Size of Workload.} \quad (2)$$

Partitioning (562) the data therefore may include identifying (564) a value that satisfies a predefined criterion. The value includes a summation (e.g., as in expression (1)) over the multiple types of processing nodes of a number of allocated processing nodes of a respective type times an expected resource usage for processing a data partition of a respective size on a processing node of the respective type.

The values of $N_a[i]$ and $S[i]$ that produce the value of expression (1) that satisfies the predefined criterion are the results of the partitioning: they indicate the number of processing nodes of each type i that are allocated for processing the data and the size $S[i]$ of the data partitions assigned to respective processing nodes of each type i. All of the allocated processing nodes of a given type i therefore are assigned respective data partitions of size $S[i]$ in accordance with some embodiments.

Thus, for each respective type of processing node, data partitions of the respective size $S[i]$ are assigned (566) to the $N_a[i]$ allocated processing nodes of the respective type.

In some embodiments, identifying the value of expression (1) that satisfies the predefined criterion includes minimizing the value of expression (1). In some other embodiments, identifying the value of expression (1) that satisfies the predefined criterion may include identifying a value of expression (1) that is less than a specified value or that is less than a specified number of other possible values of expression (1). In still other embodiments, resource usage metrics (e.g., as stored in the matrix Expected_resource_usage[i,S]) may be defined that increase with decreasing resource usage. Identifying the value of expression (1) that satisfies the predefined criterion may then include, for example, maximizing the value of expression (1), identifying a value of expression (1) that is greater than a specified value, or identifying a value of expression (1) that is greater than a specified number of other possible values of expression (1).

Examples of expression (1) include, but are not limited to:

$$\Sigma_i N_a[i]*\text{Expected\_time}[i, S[i]], \quad (3)$$

$$\Sigma_i N_a[i]*\text{Expected\_energy}[i, S[i]], \text{ or} \quad (4)$$

$$\Sigma_i N_a[i]*\text{Expected\_cost}[i, S[i]]. \quad (5)$$

In some embodiments, partitioning (562) the data includes identifying a value that satisfies a predefined criterion, wherein the value includes a summation over the multiple types of processing nodes of a cost of processing data partitions of a respective size on allocated processing nodes of a respective type. For example, a value of the following expression is identified that satisfies a predefined criterion:

$$\Sigma_i \text{Cost}(N_a[i]*\text{Expected\_resource\_usage}[i, S[i]]) \quad (6)$$

Expression (6) may be used as an alternative to using cost as the resource usage metric itself.

In some embodiments, the expected resource usage is time or energy and the cost function in expression (6) maps time or energy values to prices. Examples of values of expression (6) that satisfy a predefined criterion include, but are not limited to, values that minimize expression (6), values that are less than a specified value, or values that are less than a specified number of other possible values of expression (6). Like expression (1), expression (6) is evaluated with the constraint of expression (2) that the data partitions must sum to the total size of the data (e.g., the size of the problem data 112, FIG. 1, and thus of the workload).

The values of $N_a$ and $S[i]$ that produce the value of expression (6) that satisfies the predefined criterion are then used to assign (566) data partitions to different processing nodes: for each type i of processing node, a number $N_a[i]$ of processing nodes are assigned data partitions of size $S[i]$.

In some embodiments, the data in the method 550 (e.g., problem data 112, FIG. 1) is structured as a list 300 (FIG. 3). Partitioning (562) the data includes assigning respective portions of the list to respective processing nodes of the plurality of processing nodes. Processing nodes of respective types are assigned portions of respective sizes (e.g., respective numbers of records 302, or records 302 of respective sizes) (e.g., based on the values $N_a[i]$ and $S[i]$ as determined in accordance with expression (1) or (6)).

In some embodiments, the data in the method 550 (e.g., problem data 112, FIG. 1) is structured in a graph 400 (FIG. 4). Partitioning (562) the data includes dividing the vertices 402 into partitions (e.g., as shown by respective fill patterns in FIG. 4) and assigning the partitions to respective processing nodes of the plurality of processing nodes. Processing nodes of respective types i are assigned partitions of respective sizes i (e.g., respective numbers of vertices 402, or vertices 402 of respective sizes) (e.g., based on the values $N_a[i]$ and $S[i]$ as determined in accordance with expression (1) or (6)).

The methods 500 and 550 allow for efficient processing of data partitions in a distributed computing system 100 (FIG. 1), by accounting for the processing capabilities of respective nodes when partitioning data. For example, the methods 500 and 500 improve throughput and/or reduce energy usage. While the methods 500 and 550 include a number of operations that appear to occur in a specific order, it should be apparent that the methods 500 and 550 can include more or fewer operations, performance of two or more operations may overlap, and two or more operations may be combined into a single operation. In some embodiments, the methods 500 and 550 may be performed repeatedly (e.g., in a hierarchical manner within a hierarchical system that includes the distributed computing system 100 at a particular level).

Figure 6:
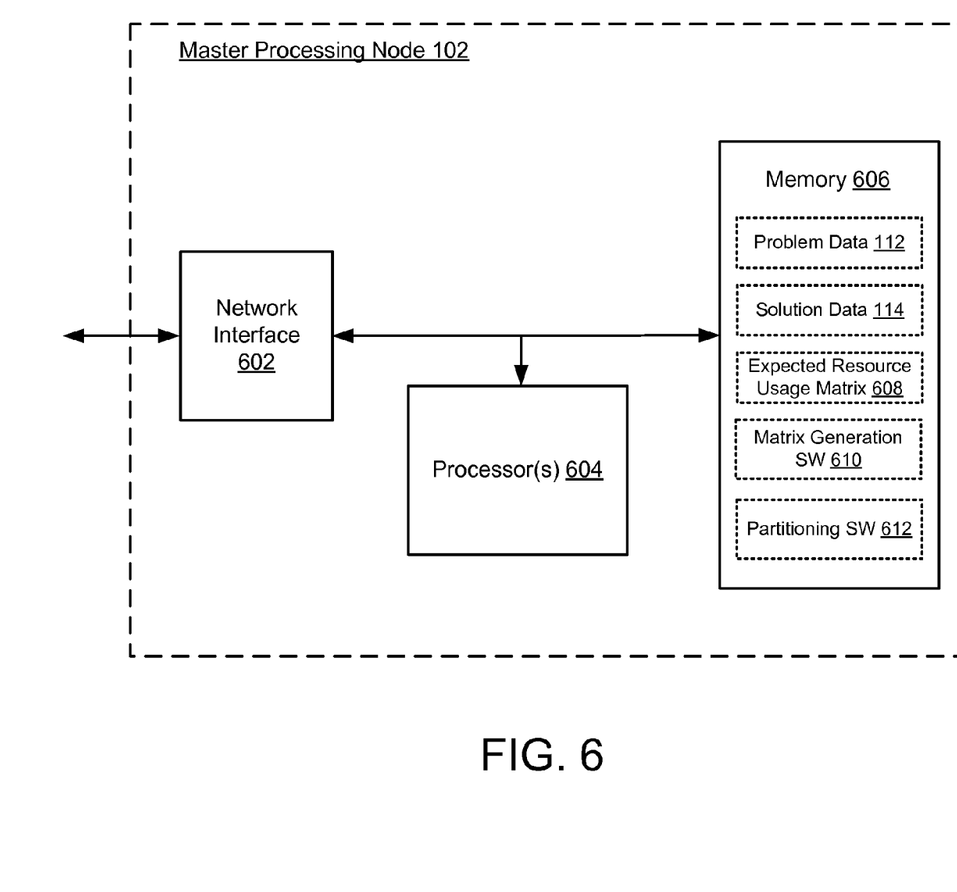
FIG. 6 is a block diagram of a master processing node in accordance with some embodiments.

FIG. 6 is a block diagram of a master processing node 102 (FIG. 1) in accordance with some embodiments. A network interface 602 in the master processing node 102 transmits and receives signals through the network 106 (FIG. 1). The network interface 602 may also receive the command 110 and problem data 112 and transmit the solution data 114 (FIG. 1). One or more processors 604 (e.g., including one or more CPUs 202, FIGS. 2A-2D) are coupled to the network interface 602 and to memory 606. The memory 606 may store problem data 112 (FIG. 1), solution data 114 (FIG. 1), and/or an expected resource usage matrix (Expected_resource_usage[i,S]) 608 (e.g., Expected_time[i,S], Expected_energy[i,S], or Expected_cost[i,S]).

The memory 606 may include a non-transitory computer-readable storage medium (e.g., one or more nonvolatile memory devices) that stores one or more programs with instructions configured for execution by the one or more processors 604. The one or more programs include matrix generation software 610 and/or partitioning software 612. The matrix generation software 610 includes instructions that, when executed by the one or more processors 604, cause the master processing node 102 to perform the operations 554 and 556 of the method 550 (FIG. 5B). The partitioning software 612 includes instructions that, when executed by the one or more processors 604, cause the master processing node 102 to perform the operations 504 and 506 of the method 500 (FIG. 5A) and/or the operations 504 and 562 (e.g., including the operations 564 and 566, FIG. 5B) of the method 550 (FIG. 5B). The non-transitory computer-readable storage medium of the memory 606 thus may include instructions for performing all or a portion of the methods 500 and/or 550 (FIGS. 5A-5B). These instructions may also be stored on a non-transitory computer-readable storage medium (e.g., a CD-ROM, DVD, or magnetic tape) that is external to the master processing node 102.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A method of partitioning a workload among a plurality of processing nodes of multiple types, wherein different types of processing nodes have distinct processing capabilities, the method comprising:
   in a first processing node of the plurality of processing nodes:
      creating a matrix of expected resource usages for processing data partitions of various sizes on processing nodes of the multiple types, the matrix comprising an estimate of, for each type of processing node, resource usage for processing each data partition size in a set of data partition sizes, wherein the matrix comprises expected amounts of energy consumed when processing the data partitions of the various sizes on the processing nodes of the multiple types;
      responsive to a command, partitioning data associated with the command among the plurality of processing nodes based at least in part on the distinct processing capabilities of the multiple types of processing nodes as represented by the matrix; and
      assigning the partitioned data to respective types of processing nodes in the plurality of processing nodes for processing by the respective types of processing nodes.

2. The method of claim 1, wherein partitioning the data comprises dividing the data into partitions of respective sizes for processing nodes of respective types.

3. The method of claim 1, wherein the matrix comprises expected times for processing the data partitions of the various sizes on the processing nodes of the multiple types.

4. The method of claim 1, further comprising, in the first processing node:
   querying respective nodes of the plurality of processing nodes to determine their processing capabilities; and
   creating the matrix based at least in part on results of the querying.

5. The method of claim 1, wherein the partitioning comprises:
   identifying a value that satisfies a predefined criterion, the value comprising a summation over the multiple types of processing nodes of a number of allocated processing nodes of a respective type times an expected resource usage for processing a data partition of a respective size on a processing node of the respective type; and
   for each respective type of processing node, assigning data partitions of the respective size to the allocated processing nodes of the respective type.

6. The method of claim 5, wherein identifying the value that satisfies the predefined criterion comprises minimizing the value.

7. The method of claim 5, wherein the expected resource usage comprises an expected processing time.

8. The method of claim 5, wherein the expected resource usage comprises an expected amount of energy.

9. The method of claim 1, wherein the partitioning comprises:
   identifying a value that satisfies a predefined criterion, the value comprising a summation over the multiple types of processing nodes of a cost of processing data partitions of a respective size on allocated processing nodes of a respective type; and
   for each respective type of processing node, assigning data partitions of the respective size to the allocated processing nodes of the respective type.

10. The method of claim 1, wherein:
    the data is structured in a list; and
    the partitioning comprises assigning respective portions of the list to respective processing nodes of the plurality of processing nodes, wherein processing nodes of respective types are assigned portions of respective sizes.

11. The method of claim 1, wherein:
    the data is structured in a graph comprising vertices; and
    the partitioning comprises dividing the vertices into partitions and assigning the partitions to respective processing nodes of the plurality of processing nodes, wherein processing nodes of respective types are assigned partitions of respective sizes.

12. A processing node, comprising:
one or more processors; and
memory storing one or more programs configured for execution by the one or more processors, the one or more programs comprising:
instructions to create a matrix of expected resource usages for processing data partitions of various sizes on a plurality of processing nodes having different types of processing nodes with distinct processing capabilities, the matrix comprising an estimate of, for each type of processing node, resource usage for processing each data partition size in a set of data partition sizes, wherein the matrix comprises expected amounts of energy consumed when processing the data partitions of the various sizes on the processing nodes of the multiple types;
instructions to partition data among the plurality of processing nodes in response to a command associated with the data based at least in part on the distinct processing capabilities of the multiple types of processing nodes as represented by the matrix; and
instructions to assign the partitioned data to respective types of processing nodes in the plurality of processing nodes for processing by the respective types of processing nodes.

13. The processing node of claim 12, wherein the one or more programs further comprise:
instructions to query respective nodes of the plurality of processing nodes to determine their processing capabilities.

14. The processing node of claim 12, wherein the instructions to partition comprise:
instructions to identify a value that satisfies a predefined criterion, the value comprising a summation over the multiple types of processing nodes of a number of allocated processing nodes of a respective type times an expected resource usage for processing a data partition of a respective size on a processing node of the respective type; and
instructions to assign, for each respective type of processing node, data partitions of the respective size to the allocated processing nodes of the respective type.

15. The processing node of claim 14, wherein the instructions to identify the value that satisfies the predefined criterion comprise instructions to minimize the value.

16. The processing node of claim 12, wherein the instructions to partition comprise:
instructions to identify a value that satisfies a predefined criterion, the value comprising a summation over the multiple types of processing nodes of a cost of processing data partitions of a respective size on allocated processing nodes of a respective type; and
instructions to assign, for each respective type of processing node, data partitions of the respective size to the allocated processing nodes of the respective type.

17. A non-transitory computer-readable storage medium storing one or more programs configured for execution by one or more processors, the one or more programs comprising:
instructions to create a matrix of expected resource usages for processing data partitions of various sizes on a plurality of processing nodes having different types of processing nodes with distinct processing capabilities, the matrix comprising an estimate of, for each type of processing node, resource usage for processing each data partition size in a set of data partition sizes, wherein the matrix comprises expected amounts of energy consumed when processing the data partitions of the various sizes on the processing nodes of the multiple types;
instructions to partition data among the plurality of processing nodes in response to a command associated with the data based at least in part on the distinct processing capabilities of the multiple types of processing nodes as represented by the matrix; and
instructions to assign the partitioned data to respective types of processing nodes in the plurality of processing nodes for processing by the respective types of processing nodes.

18. The computer-readable storage medium of claim 17, wherein the one or more programs further comprise:
instructions to query respective nodes of the plurality of processing nodes to determine their processing capabilities.

* * * * *